May 14, 1963 R. SCHULTEN ETAL 3,089,835
HETEROGENEOUS NUCLEAR REACTOR
Filed Oct. 25, 1957 4 Sheets-Sheet 2
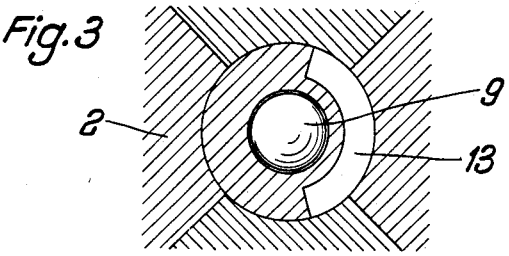
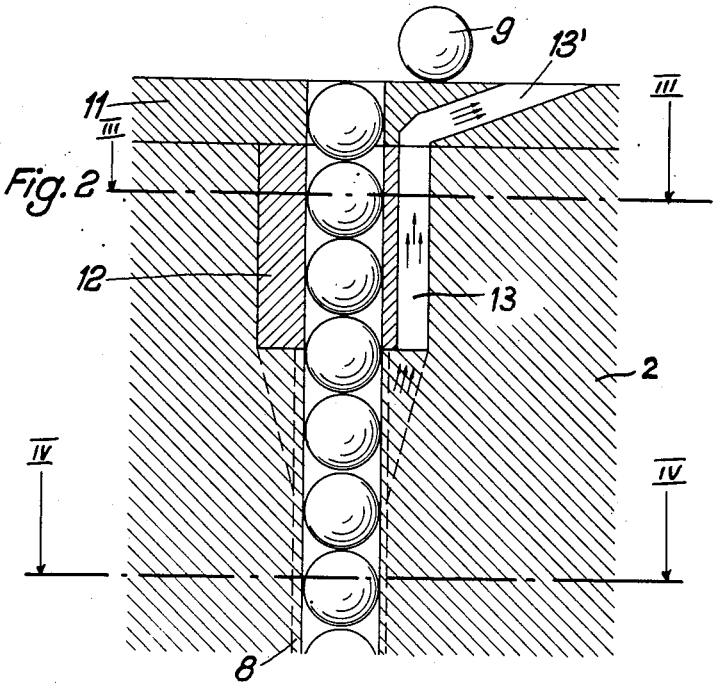
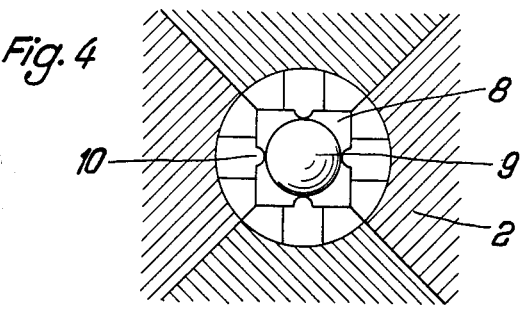

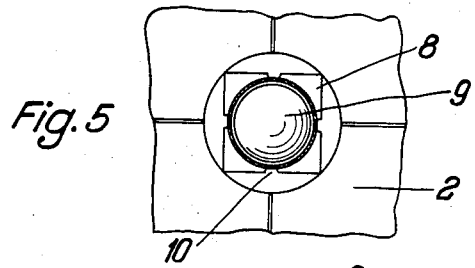
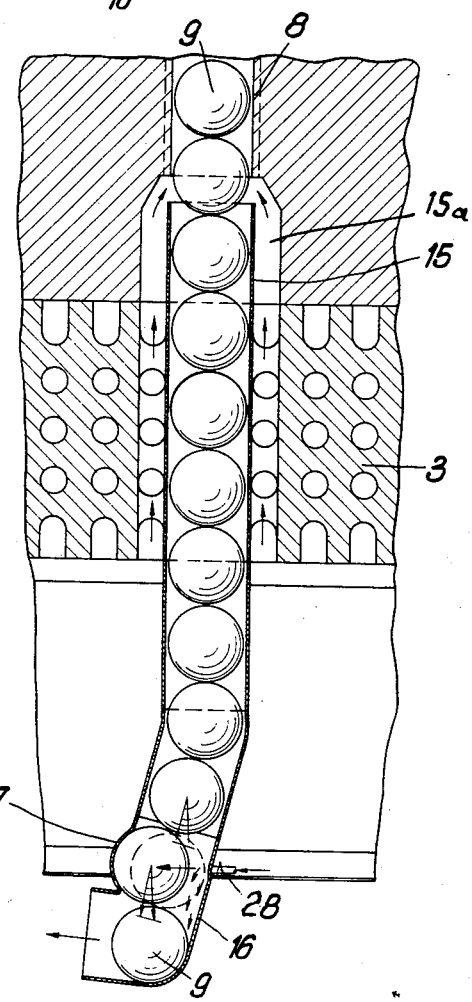

May 14, 1963 R. SCHULTEN ETAL 3,089,835
HETEROGENEOUS NUCLEAR REACTOR
Filed Oct. 25, 1957 4 Sheets-Sheet 4

INVENTORS
RUDOLF SCHULTEN
WERNFRIED GUTH
ANDREAS SETZWEIN
HELMUT BRAUN
GEORG BERBERICH

United States Patent Office 3,089,835
Patented May 14, 1963

3,089,835
HETEROGENEOUS NUCLEAR REACTOR
Rudolf Schulten, Mannheim, Wernfried Güth, Mannheim-Gartenstadt, Andreas Setzwein, Neu-Hermsheim, Helmut Braun, Rulzheim, and Georg Berberich, Mannheim, Germany, assignors to Brown, Boveri & Cie Aktiengesellschaft, Mannheim, Germany, a corporation of Germany
Filed Oct. 25, 1957, Ser. No. 692,334
Claims priority, application Germany Oct. 27, 1956
12 Claims. (Cl. 204—193.2)

Our invention relates to nuclear reactors of the heterogeneous type. In known reactors of this type the reactor core is formed by a block of graphite with a multiplicity of parallel bores for receiving the nuclear fuel elements. The generated heat is removed by means of a moderator-coolant usually passing around and along the reactor core.

It is an object of our invention to facilitate charging the fuel elements into such reactors and removing the spent fuel therefrom. Another, conjoint object is to improve the heat transfer and thermal efficiency of such reactors.

To this end, and in accordance with a feature of our invention, we use ball-shaped and preferably porous fuel elements, and we provide the graphite core, mounted between a perforated top plate and a perforated bottom plate, with parallel channels of square cross section which possess protuberances, such as noses or ridges, along their longitudinal wall surfaces for guiding the spherical fuel elements. We further provide the reactor with means for passing at least part of the coolant through the interspaces between the fuel elements and the walls of the square-shaped bores. Preferably, the width of each channel is only slightly larger than the diameter of the fuel elements so that each channel can receive only one column of spherical fuel elements.

According to another feature of our invention, we provide each of the above-mentioned top and bottom plates of the core structure with separate openings for the fuel elements and the coolant respectively, the openings for the fuel elements having a circular cross section only slightly larger than the diameter of the spherical fuel elements and extending in coaxial relation to the respective fuel channels in the graphite block.

According to a further, more specific feature of the invention, the coolant channels in the top plate of the reactor core are branched-off laterally from the circular openings for the fuel elements and extend in the top plate at an angle to the horizontal so that the coolant issuing from these channels into a plenum chamber is guided to flow in a slanting direction upwardly. We further provide the top or dome structure of the reactor vessel with channels for supplying another current of the same coolant. The latter current passes along the outside of the reactor core before it enters through the channels of the dome structure into the above mentioned plenum chamber, and the coolant channels in the dome structure are directed at a slant downwardly. The current of coolant issuing from the upwardly inclined channels of the core top plate and the downwardly directed currents of coolant passing through the channels in the reactor dome are thus caused to merge in the plenum chamber above the reactor core and to produce a vigorous intermixing of the entire amount of coolant, that is to leave the plenum chamber in hot condition for the purpose of doing work. By regulating the component currents of coolant just mentioned, the temperature of the total quantity of heated coolant issuing from the nuclear reactor can be adjusted to a desired value.

According to still another feature of our invention, we supply the ball-shaped fuel elements individually into the reactor vessel above the top plate of the reactor core, preferably through a lock or sluice; and we give the above-mentioned coolant channels such a direction that the coolant passes into the plenum chamber above the top plate in a tangential direction relative to the essentially circular cross section of the reactor vessel. As a result, the fresh fuel elements individually sluiced into the reactor vessel are entrained by the current to first run on the top plate approximately on a circle or on a spiral path until the elements drop into a vacant space within one of the fuel channels of the core. Depending upon the particular way of supplying the fuel elements, the top surface of the top plate may be given concave or convex shape.

According to another feature of our invention, we connect to the bottom plate of the reactor core a number of tubular extensions which extend downwardly in coaxial relation to the respective fuel channels and are each provided with a knee-shaped lower end that prevents the ball-shaped fuel elements from inadvertently dropping out of the channel. We further provide the tubular extensions with a controllable pressure-gas connection for removing the lowermost fuel element from the knee-shaped end. The tubular extension is preferably provided with a bulge immediately above the knee-shaped end, and the above-mentioned pressure-gas connection is so located as to permit forcing an individual fuel element into the bulge, thus relieving the lowermost fuel element, located in the knee, from the weight of the column of elements, and permitting the lowermost element to drop into a collecting space in the bottom portion of the reactor vessel. However, instead of the above-mentioned pressure-gas connection, or in addition thereto, mechanical tappets may be provided which control the position of the fuel elements in the manner just described.

Particularly suitable as fuel substance in reactors according to the invention is sintered uranium carbide (UC). This substance has a theoretical density of approximately 14 g./cm.$^3$. However, the spherical elements are produced from pulverulent or granular material by pressing and sintering so as to have a lower density, preferably about 10 g./cm.$^3$. The substance is high-temperature resistant and possesses sufficient resistance to changes in temperature in the main operating range of 600 to 2000° C. The mechanical strength of such spherical fuel elements is sufficient for the purposes of the invention. As with all sintered material, the fuel elements are somewhat brittle and for that reason are used in ball shape. At the above-mentioned preferred density of the pressed and sintered elements, the porosity of the material is so great as to permit the escape of substantially all gaseous fission products evolving from the nuclear chain reaction. This expedient affords a considerable improvement in neutron economy because it avoids the absorption of neutrons, particularly in the xenon.

The above mentioned objects, advantages and features of our invention will be more fully understood from the embodiment of a nuclear reactor according to the invention illustrated by way of example on the drawings, in which:

FIG. 2 illustrates a vertical section through one of the channels in the graphite core of the reactor and through a top plate of the core.

FIG. 3 shows a horizontal cross section of one of channels, the section being taken along the line III—III indicated in FIG. 2.

FIG. 4 shows horizontal cross section through one of the channels, taken along the line IV—IV in FIG. 2.

FIG. 5 illustrates a cross section similar to FIG. 4 but relates to a different arrangement of the individual components of the graphite core structure.

FIG. 6 is a vertical section through part of the reactor, showing a device for discharging spent fuel elements from the core channels and for supplying coolant into the fuel channels.

Figure 1:
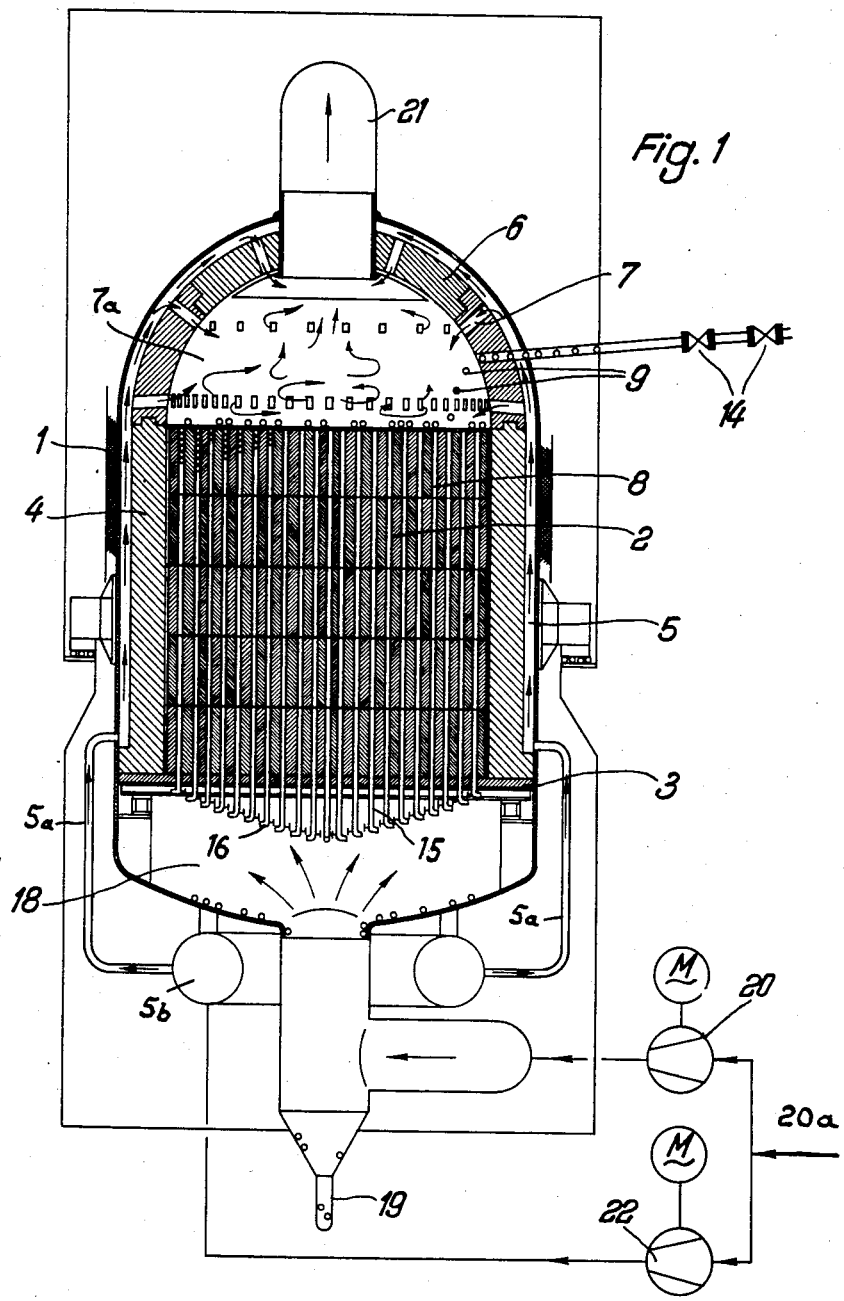
FIG. 1 shows a longitudinal section through the entire reactor and schematically represents all accessories required for its operation.

As illustrated in FIG. 1, the reactor comprises a steel shell schematically indicated at 1 within which the reactor vessel proper is located. The reactor vessel comprises a cylindrical reflector of graphite 4 in which the reactor core is located. The reactor core is formed by a block structure 2 of graphite which may consist of several layers stacked upon each other as shown, or composed of individual blocks located side by side. If the block is formed of layers, each layer may also be composed of individual blocks as is apparent from FIGS. 3, 4 and 5. The entire block structure is supported on a bottom plate 3 which is perforated so that the individual vertical fuel channels 8 in the graphite block are in registery with the respective perforations.

Channels 5 for the passage of coolant extend upwardly between the reflector 4 and the shell 1. The coolant is supplied from below into the channels 5 through pipes 5a communicating with an annular chamber 5b. From channels 5 the coolant passes through a number of bores 7 in the dome-shaped top portion 6 of the reactor vessel and thus enters into a plenum chamber 7a above the core. Another quantity of coolant passes from a chamber 18 in the bottom portion of the reactor vessel through the fuel channels 8 in the block 2 and thence also into the plenum chamber 7a in the dome portion of the vessel where it merges and mixes with the coolant supplied through the bores 7. Preferably used is a gaseous coolant such as a noble gas, for example helium or argon.

The fuel channels 8 in the graphite block 2 have square cross section (FIGS. 4, 5). Consequently, when the bores are filled with ball-shaped fuel elements 9, there remains an interspace between these elements and the vertical walls of the fuel channel. The above-mentioned flow of coolant from the bottom portion of the reactor vessel passes through these interspaces and thus is directly in contact with the fuel elements.

The longitudinal walls in each fuel channel have protuberances or noses 10 which guide the fuel elements 9 and increase the cross section of the above-mentioned interspace. The square cross section of the fuel channels has the advantage of securing the smallest possible pressure drop as well as sufficient heat-exchanging action of the coolant passing through the channels. The width of each channel is only slightly larger than the diameter of the spherical fuel elements so that each channel receives only one vertical column of elements.

The individual graphite bodies of which the reactor core is composed are so put together as to provide sufficient interstices between these bodies to permit expansion at increasing temperature without subjecting the reactor core to excessive stress.

The individual fuel channels 8 terminate upwardly in a top plate 11 of graphite or beryllium oxide and an adjacent insert 12 of graphite as shown in FIGS. 2 and 3. Each insert 12 has a lateral groove 13 which merges with an inclined channel 13' of the top plate 11 so that the main current of coolant passes laterally out of the fuel channel 8 and then through the inclined channel 13' which blows the coolant at a slant into the plenum chamber beneath the dome of the reactor vessel. The square channel 8 merges with a circular channel portion in the graphite insert 12. The vertical length of the fuel passage in insert 12 is preferably such as to accommodate a number of fuel balls 9, for example 5 to 8, in order to prevent the balls from being thrown upwardly out of the channel by the pressure of the gaseous coolant.

Figure 7:
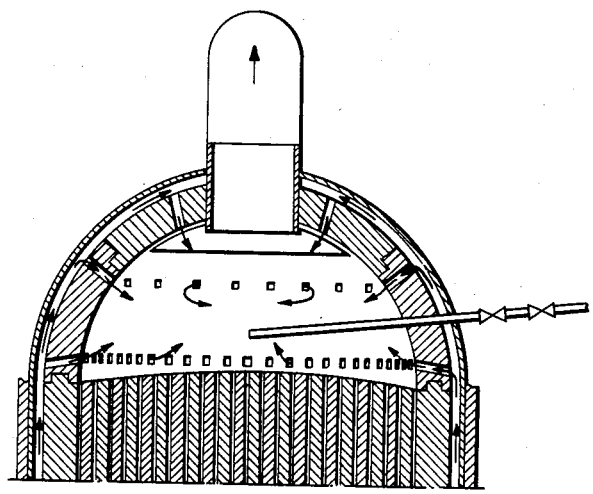
FIG. 7 illustrates in cross section a modification with the top plate as convex in shape.
Figure 8:
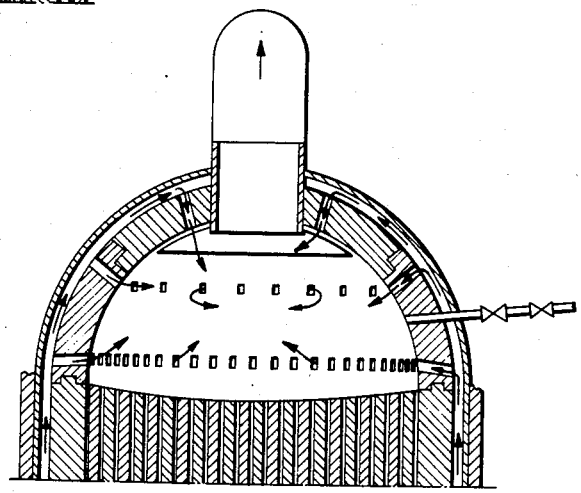
FIG. 8 shows in cross section another modification with the top plate concave in shape.

The fuel elements are charged into the top portion of the reactor vessel through a lock or sluice device which according to FIG. 1 may be formed of two valves 14. It is preferable to pass the fuel elements, prior to charging them into the reactor, through a pre-heater stage in order to prevent subjecting them to excessive thermal tension. After passing through the lock 14, the fuel elements drop onto the top surface of the reactor core or onto the top plate 11 (FIG. 2) where they are freely movable. The coolant gas issuing laterally out of the channels 13' of the top plate 11 continuously maintains the ball-shaped elements 9 in circular motion. The balls continue running on the top plate 11, which as mentioned may be given convex (FIG. 7) or concave (FIG. 8) shape if desired, until the elements find a vacant channel 8 and drop into that channel.

Figure 9:
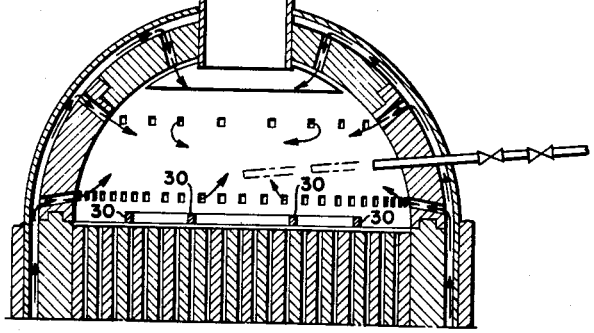
FIG. 9 shows in cross section a further modification with concentric ridges dividing the top plate into different independent zones.

The surface of the top plate may be subdivided by ridges 30 (FIG. 9) into different zones so that these zones can be charged with fuel elements independently of each other. In this case, it is preferable to first charge the central portion of the reactor and to commence reactor operation while the outer zones are still free of fuel elements. When the reactor has lost part of its reactivity, the outer zones can be charged in order to reestablish the desired reactivity.

Each channel 8 is downwardly extended by means of a steel pipe 15 (FIG. 6). This pipe extends through the bottom plate 3 of the core structure and terminates downwardly in a knee 16. The pipe has a bulge 17 immediately above the knee 16. A pressure gas supply pipe 28 is connected with the steel pipe 15 at a location opposite the bulge 17. The bottom of the knee 16 slants upwardly a slight amount so that normally this bottom supports the entire column of fuel elements 9 located in the fuel channel. By applying a short-lasting surge of pressure through the pipe 28, the penultimate fuel element 9 is forced into the bulge 17 and the lowermost element 9 is pushed out of the knee 16. It will be obvious that instead of applying gas under pressure through pipe 28, a tappet operating mechanically in the same direction may also be employed. The spent fuel elements ejected from the knee 16 drop into a collecting space 18 at the bottom of the reactor vessel and thence into an outlet conduit 19 from which the elements can be individually removed through a lock or sluice device (not shown) similar to the one described above.

The heat generated in the reactor and to be utilized is taken from the reactor by the above-mentioned, preferably gaseous coolant which is pumped through the reactor vessel. The gas enters through an inlet conduit 20a and is blown from below into the bottom space 18 of the reactor vessel by means of a blower 20 (FIG. 1). Thence the gas passes through the fuel channels 8 of the reactor core 2 and into the plenum chamber 7a whence it leaves the reactor through an outlet conduit 21 in the dome portion 6. The temperature of the gases leaving the reactor core is so adjusted that substantially the same temperature obtains in the upper portion of the respective fuel channels. This is done by properly selecting or adjusting the gas-flow cross section at the bottom openings of the respective fuel channels. More specifically, the cross section in the bottom portion of the channels is graduated from the center outward in radial direction of the reactor vessel in a given percentage of, or ratio to, the neutron flux density. The gas-flow areas of the channels 15a (FIG. 6) therefore are larger near the vertical center of the reactor than near the periphery of the core. As a rule, these channel openings are chosen or adjusted in accordance with the zero-order Bessel function.

As mentioned, aside from the normal flow of coolant, a regulatable quantity of gaseous coolant supplied at 20a is pumped through the reactor with the aid of the blower 22 and passes along the periphery of the reactor through the reflector or through the interstitial channels 5 between reflector and reactor shell. The separation of the main coolant circuit from the by-pass, and the provision of separate blowers in the two circulation circuits is required because of the different pressure drops in the two circuits. The quantity of gas passing through the by-pass mainly serves for cooling the reflector 4, the steel shell 1 of the reactor, and the reactor dome 6. As explained, the quantity of gas passing laterally over the dome 6 enters through the bores 7 back into the main coolant circulation, the inclined position of the channels 7 causing the by-pass flow to be thoroughly whirled and mixed together with the main flow. The lateral guidance of the main flow issuing upwardly from the fuel channels at the top surface of the reactor core also serves the purpose of thoroughly mixing the two currents of coolant. By controlling or regulating the delivering quantities of the respective blowers 20 and 22 in the main circuit and in the by-pass circuit, the temperature of the gas issuing through the top discharge conduit 21 of the reactor can be controlled and regulated.

Operation of the reactor is started by slowly filling the interior of the reactor with fuel elements 9. Commencing with a given degree of filling, the reactor becomes critical and its tempertaure gradually increases. By then supplying more fuel elements, the reactor can be slowly brought up to the intended operating temperature. Normal operation is then commenced by operating the blowers 20 and 22. After starting the blowers, the temperature at first commences to drop. After a given interval of time, however, the operating temperature of the reactor again adjusts itself independently of the power output obtained from the heated medium leaving through the outlet conduit 21.

Operation of the reactor is shut down by stopping the blowers 20 and 22. Then the temperature in the interior of the reactor first increases. After a certain period of time, the operating temperature again establishes itself due to the negative temperature coefficient of the chain reaction. The regulator rods required for other reactors are not necessarily used with a reactor according to the invention. This is so because a temperature variation of some hundred degrees has no disturbing effect upon the fuel elements.

After shut-down of the reactor the residual energy due to delay gamma and beta radiation, in the amount of 4 to 5% of the normal power output, can be removed by means of an auxiliary blower. However, it is not always necessary to use or operate such an auxiliary blower because any great increase in temperature of the fuel elements results in greatly increased heat dissipation from the reactor by heat radiation. This heat is absorbed by the graphite whose heat capacity is sufficient for some period of time to take care of reeciving the residual energy produced after shut-down.

In an extreme emergency, such as rupture of the reactor vessel, the chain reaction can be completely terminated within a very short interval of time by supplying the main and/or by-pass circuits with a gas current of highly absorptive atom nuclei. Particularly suitable gases for this purpose are boron trifluoride, boron hydride or helium$^3$.

The following numerical values, given by way of example, relate to an embodiment as illustrated and described above:

Diameter of fuel elements (UC): 5 cm.
Density of fuel elements: 10 gram/cm.$^3$
Cross section of fuel channels: 6 x 6 cm.
Quantity of moderator noble-gas per fuel channel: 0.4 m.$^3$ per second.
Height of reactor core (graphite): 6 m.
Number of elements required for initial operation: about 80.
Height of fuel column at critical operation: about 4 m.

It will be apparent to those skilled in the art, upon a study of this disclosure that, with respect to structural details, our invention permits of various modifications and hence may be embodied in reactor designs other than those therein illustrated and described, without departing from the essential features of our invention and within the scope of the claims annexed hereto.

We claim:
1. A nuclear heterogeneous reactor, comprising a reactor core of graphite having a multiplicity of vertical fuel channels and having ball-shaped fuel elements of predetermined and approximately uniform diameter in said channels when in operative condition, said channels having a square cross section and having inwardly projecting protuberances forming part of said reactor core and located along the channel walls for guiding said elements whereby interspaces of predetermined dimensions are formed between said elements and said channel walls, the transverse distance between said guiding protuberances being only wide enough for a single one of said fuel elements to be disposed within said transverse distance at a time, to thereby axially align a plurality of said ball-shaped fuel elements within said channels, a top plate and bottom plate adjoining said core at the top and bottom thereof respectively; supply means for discharging said fuel elements in sequence individually onto the upper surface of said top plate, each of said two plates having circular openings coaxially aligned with said respective channels and smaller than said square cross section so as to just permit passage of said fuel elements, and each of said two plates having passages adjacent to said respective openings and communicating with said interspaces, and coolant circulation means forming a coolant path through said passages and said interspaces.

2. A nuclear reactor according to claim 1, comprising a vessel structure enclosing said core and having a top portion forming an enclosed top space above said top plate, said coolant circulation means comprising an outlet conduit communicating with said top space and inlet conduit means communicating with said passages of said bottom plate, and said coolant circulation means comprising by-pass ducts extending in said vessel structure upwardly along said core to said top portion, said top portion having coolant channels directed at a slant downwardly toward said top space for passing coolant from said by-pass ducts into said top space, and said passages in said top plate extending at a slant upwardly, whereby the two currents of coolant entering said top space are whirled and mixed together before leaving through said outlet conduit.

3. A nuclear reactor according to claim 2, comprising fuel-element feeder means extending from the outside of said vessel structure to said top space and having a lock for individually charging said fuel elements onto said top plate, and said passages in said top plate and in said top portion having a direction which has a tangential component relative to said vessel structure so as to maintain said coolant in rotary motion within said top space, whereby the fuel elements charged onto said top plate are entrained to roll on said plate until they drop into said fuel channels.

4. A nuclear heterogeneous reactor, comprising a reactor core of graphite having a multiplicity of vertical fuel channels and having ball-shaped fuel elements of predetermined and approximately uniform diameter in said channels when in operative condition, said channels having a square cross section so that interspaces of predetermined dimensions are formed between said fuel elements and the inner edges of said channels, said channels having inwardly projecting protuberances forming part of said reactor core and extending longitudinally between said edges for guiding said fuel elements, the transverse distance between said guiding protuberances being only wide enough for a single one of said fuel elements to be disposed within said transverse distance at a time, to thereby axially align a plurality of said ball-shaped fuel elements within said channels, a vessel structure enclosing said core and having a top portion forming an enclosed top space above said core, a coolant outlet communicating with said top space, supply means for discharging fuel elements in sequence individually into said top space, coolant supply means communicating with said fuel channels at the lower end thereof for passing coolant through said interspaces along said fuel elements and into said top space, and coolant by-pass duct means extending from said supply means along the outside of said core into said top space.

5. A nuclear heterogeneous reactor, comprising a reactor core of graphite having a multiplicity of vertical fuel channels and having ball-shaped fuel elements of predetermined and approximately uniform diameter in said channels when in operative condition, said channels having a square cross section so that interspaces of predetermined dimensions are formed between said fuel elements and the inner edges of said channels, said channels having inwardly projecting protuberances forming part of said reactor core and extending longitudinally between said edges for guiding said fuel elements, the transverse distance between said guiding protuberances being only wide enough for a single one of said fuel elements to be disposed within said transverse distance at a time, to thereby axially align a plurality of said ball-shaped fuel elements within said channels, a vessel structure enclosing said core and having a top portion forming an enclosed top space above said core, a coolant outlet communicating with said top space, coolant supply means communicating with said fuel channels at the lower end thereof for passing coolant through said interspaces along said fuel elements, coolant passages forming a communication between the upper portion of said respective fuel channels and said top space and extending in a direction having a tangential component so as to maintain the coolant in rotating motion within said top space, and fuel-element feeder means extending from the outside of said vessel structure to said top space for discharging fuel elements individually in said top space, whereby the fuel elements supplied by said feeder means are kept in rotary travel by said coolant until they drop into said fuel channels.

6. A nuclear reactor according to claim 1, comprising tubular extensions extending downwardly from said bottom plate in coaxial alignment with said respective fuel channels, each of said extensions having a laterally open knee at its lower end for normally supporting the fuel elements in said fuel channel and said extension, and ejector means connected with each of said knees for ejecting the lowermost fuel element.

7. A nuclear reactor according to claim 1, comprising tubular extensions extending downwardly from said bottom plate in coaxial alignment with said respective fuel channels, each of said extensions having a laterally open knee at its lower end for normally supporting the fuel elements in said fuel channel and said extension, and a gas-pressure conduit connected with said tubular extension at the side opposite the opening of said knee for ejecting the lowermost fuel element.

8. A nuclear reactor according to claim 1, comprising a vessel structure enclosing said core and having an enclosed top space above said top plate and an enclosed bottom space below said bottom plate, said coolant circulation means having an inlet connected with said bottom-plate passages and an outlet connected with said top space, said fuel channels having respective coaxial, tubular extensions protruding downwardly from said bottom plate into said bottom space, each of said extensions having a laterally open knee at its lower end for normally supporting the fuel elements in said fuel channel and having an outward bulge located upwardly adjacent to the bight of said knee, and pressure means joined with said extension at a location opposite said bulge for forcing one of the fuel elements into said bulge to thereby release the lowermost fuel element from said knee.

9. A nuclear reactor according to claim 1, comprising a vessel structure enclosing said core and having an enclosed top space above said top plate and an enclosed bottom space below said bottom plate, said coolant circulation means having an inlet connected with said bottom space and an outlet connected with said top space, tubular members coaxially aligned with said respective fuel channels and extending from the lower end of each fuel channel through said bottom plate into said bottom space, and said passages of said bottom plate extending concentrically around said respective extensions.

10. A nuclear reactor according to claim 1, said top plate being of upwardly convex shape for guiding said fuel elements into respective ones of said channels.

11. A nuclear reactor according to claim 1, said top plate being of upwardly concave shape for guiding said fuel elements into respective ones of said channels.

12. A nuclear reactor according to claim 1, said top plate having ridges fixed thereto subdividing said top plate into a plurality of separate communicating zones chargeable with said fuel elements.

References Cited in the file of this patent
UNITED STATES PATENTS

| | | |
|---|---|---|
| 2,621,042 | Stein et al. | Dec. 9, 1952 |
| 2,736,696 | Wigner et al. | Feb. 28, 1956 |
| 2,782,158 | Wheeler | Feb. 19, 1957 |

OTHER REFERENCES

Bryun et al.: "International Conference on the Peaceful Uses of Atomic Energy," vol. 3, pp. 121–124, August 1955, U.N. Publication, N.Y.